United States Patent Office 3,215,705
Patented Nov. 2, 1965

3,215,705
4-AMINO-3-HYDROXYMETHYL INDOLE DERIVATIVES
George Rodger Allen, Jr., Old Tappan, N.J., assignor to American Cyanamid Company, Stamford, Conn., a corporation of Maine
No Drawing. Filed Oct. 11, 1963, Ser. No. 315,693
4 Claims. (Cl. 260—319)

This invention relates to new organic compounds and, more particularly, is concerned with novel substituted 4-amino-3-hydroxymethylindoles and with novel methods of preparing these compounds. The novel substituted 4-amino-3-hydroxymethylindoles of the present invention may be represented by the following general formula:

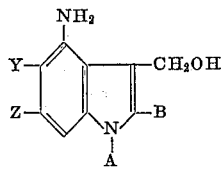

wherein A and Z are lower alkyl, Y is lower alkoxy, and B is hydrogen or lower alkyl. Suitable lower alkyl and lower alkoxy groups contemplated by the present invention are those having up to about 6 carbon atoms.

The organic bases of this invention form acid-addition salts with a variety of organic and inorganic salt-forming reagents. Thus, acid-addition salts, formed by admixture of the organic free base with an acid, suitably in a neutral solvent, are formed with such acids as sulfuric, phosphoric, hydrochloric, hydrobromic, sulfamic, citric, lactic, malic, succinic, tartaric, acetic, benzoic, gluconic, ascorbic and related acids. For purposes of this invention the free bases are equivalent to their acid-addition salts.

The novel compounds of the present invention are obtainable as crystalline materials having characteristic melting points and adsorption spectra. They are appreciably soluble in many organic solvents such as lower alkanols, acetone, ethyl acetate, and the like. They are, however, generally insoluble in water.

The novel substituted 4-amino-3-hydroxymethylindoles of the present invention are useful as intermediates in the preparation of the biologically active 3-carbamoyloxymethyl-4,7-indoloquinones and 3-acyloxymethyl-4,7-indoloquinones as is set forth in greater detail in the copending applications of Allen and Poletto, Serial No. 315,710 (now abandoned) and Serial No. 315,695, filed concurrently herewith. For example, a 4-amino-3-hydroxymethylindole may be converted to the corresponding 3-hydroxymethyl-4,7-indoloquinone upon treatment with an oxidizing agent such as Fremy's Salt.

Treatment of a 3-hydroxymethyl-4,7-indoloquinone with an acylating agent furnishes the corresponding 3-acyloxymethyl-4,7-indoloquinone derivative. Treatment of a 3-hydroxymethyl-4,7-indoloquinone with a lower alkyl chloroformate or phenyl chloroformate gives rise to the corresponding 3-alkoxycarbonyloxymethyl- or 3-phenoxycarbonyloxymethyl - 4,7 - indoloquinone derivative. The phenyl carbonate esters are particularly useful for the preparation of certain of the 3-carbamoyloxymethyl-4,7-indoloquinones. Thus, upon treatment of the phenyl carbonate esters with a lower alkyl amine there is obtained the corresponding 3-alkylcarbamoyloxymethyl-5-alkylamino-4,7-indoloquinone, while treatment with ammonia or a di(lower alkyl)amine is productive of the 3-carbamoyloxymethyl- or 3-dialkylcarbamoyloxymethyl-4,7-indoloquinone derivatives. Moreover, other 3-carbamoyloxymethyl-4,7-indoloquinones may be prepared by the treatment of a 3-hydroxymethyl-4,7-indoloquinone with a lower alkyl, lower alkenyl, or aryl isocyanate, or with a diphenyl carbamoyl chloride.

The intermediate 1,2,6-trialkyl-5-alkoxy-3-carboxaldehydes or 3-acyl derivatives may be prepared in accordance with the following reaction scheme:

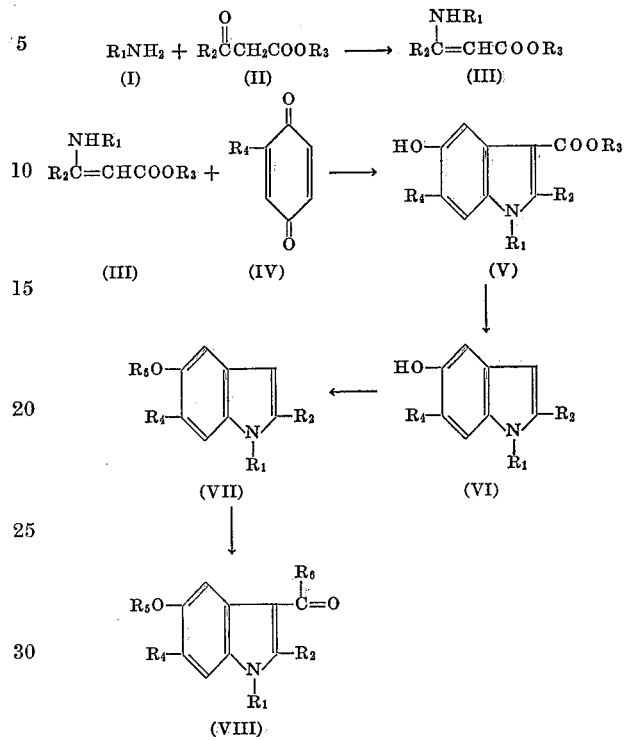

wherein $R_1$, $R_2$, $R_3$, $R_4$ and $R_5$ are lower alkyl and $R_6$ is hydrogen or lower alkyl. In accordance with this reaction scheme, the indole system (V) is developed by condensation of a substituted 1,4-benzoquinone (IV) with a substituted amino-crotonate ester (III). The latter reagent is prepared by the interaction of an appropriate amine (I) with a β-ketoester (II). Decarbalkoxylation of the 5-hydroxy-3-indolecarboxylic ester (V) gives the 5-hydroxyindoles (VI); a particularly useful reagent for this transformation being hydrochloric acid. The resulting 5-hydroxyindole (VI) is then O-alkylated to furnish the 5-alkoxyindole (VII). Treatment of this product with phosphorus oxychloride and dimethylformamide or with an alkanoyl anhydride and alkali metal alkanoate affords the corresponding 3-carboxaldehyde or 3-acyl derivative (VIII).

The novel substituted 4-amino-3-hydroxymethylindoles of the present invention may be prepared in accordance with the following reaction scheme:

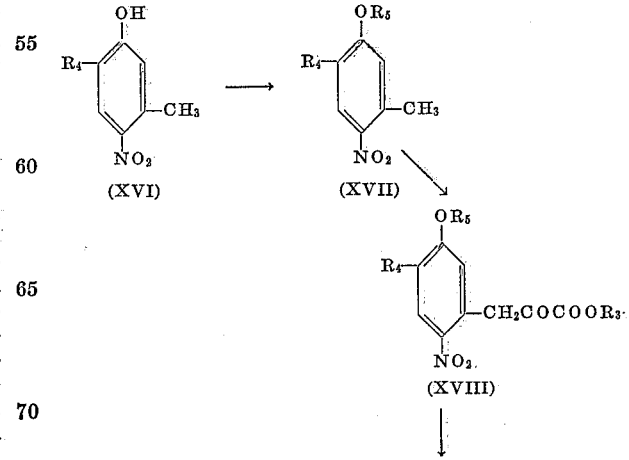

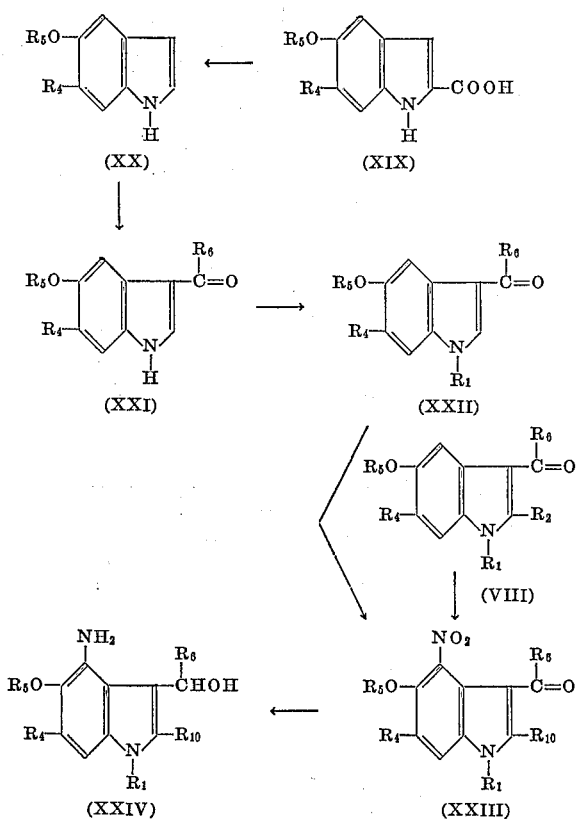

wherein $R_1$, $R_2$, $R_3$, $R_4$ and $R_5$ are lower alkyl; and $R_6$ and $R_{10}$ are hydrogen or lower alkyl. In accordance with this reaction scheme an ortho-alkyl-para-nitro-meta-cresol (XVI) is treated with an alkylating agent such as an alkyl halide or dialkyl sulfate in the presence of base to give the alkyl aryl ether (XVII). Base-catalyzed acylation of (XVII) with a dialkyl oxalate affords the glyoxylic ester (XVIII). Reductive cyclization of this ester furnishes a 6-alkyl-5-alkoxy-2-indolecarboxylic acid (XIX); this reductive cyclization may be achieved with zinc dust in acetic acid, ferrous ammonium sulfate, sodium hydrosulfite or the like. Decarboxylation of the acid (XIX) then gives the indole (XX) which on treatment with phosphorus oxychloride and dimethylformamide or a dimethylalkanoylamide furnishes the 3-formyl- or 3-acylindole (XXI). On treatment with a strong base such as potassium hydroxide or sodium hydride and an alkylating agent such as an alkyl halide or a dialkyl sulfate, the 3-formyl and 3-acylindoles (XXI) afford the corresponding 1-alkyl derivatives (XXII). These compounds (VIII and XXII) are converted into their 4-nitro derivatives (XXIII) by the action of an alkali metal nitrate in sulfuric acid or fuming nitric acid in acetic acid. On hydrogenation in the presence of a noble metal catalyst the 4-nitroindoles (XXIII) are transformed into the 4-amino-3-hydroxymethylindoles (XXIV).

The invention will be described in greater detail in conjunction with the following specific examples.

EXAMPLE 1

*Preparation of ethyl β-ethylaminocrotonate*

With mechanical stirring a stream of ethylamine is introduced into 98.5 g. (100 ml.) of ethyl acetoacetate for 3 hr. During the first hour cooling is required to hold the temperature at 35–40° where it is maintained throughout the reaction. Ether (200 ml.) is added, and the water is separated. The ether is removed from the organic phase and the residue is distilled under reduced pressure to give a water white liquid, B.P. 20 mm. 116–118°; $n_D^{25}$ 1.4941, 104 g.

EXAMPLE 2

*Preparation of ethyl 1-ethyl-5-hydroxy-2,6-dimethyl-3-indolecarboxylate*

A solution of 122 g. (0.0855 mole) of ethyl β-ethylaminocrotonate (Example 1) in 60 ml. of acetone is thoroughly swept with nitrogen and treated with 10.9 g. (0.0895 mole) of toluoquinone. The deep red solution is heated on the steam-bath for 2 hours, cooled in an ice-bath and filtered to give a dark solid. This material is washed with cold acetone and dried to give 4.45 g. of gray crystals. The combined filtrate and washings are concentrated to about 50 ml. volume and placed in the refrigerator for 16 hours. The solid is collected by filtration and washed with boiling light petroleum to give an additional 3.90 g. of crystals. A sample is recrystallized from dilute ethanol containing a trace of sodium hydrosulfite to give off-white crystals, M.P. 196–198°.

EXAMPLE 3

*Preparation of 1-ethyl-5-hydroxy-2,6-dimethylindole*

A mechanically stirred mixture of 50.0 g. of ethyl 1-ethyl-5-hydroxy - 2,6-dimethyl-3-indolecarboxylate (Example 2) and 500 ml. of 20% hydrochloric acid solution is heated at reflux temperature for 2 hours. The acid solution is diluted with 500 ml. of water, saturated with sodium chloride and extracted well with ethyl acetate. The extracts are dried over magnesium sulfate and evaporated. The residue crystallizes from methylene chloride-petroleum ether (B.P. 30–60°) to give 26.0 g. of crystals, M.P. 113–117°. An additional 4.8 g. of crystals is obtained by concentration of the mother liquor. This material also has a crystalline modification that melts at 90–92°. Both forms have identical infrared spectra in carbon tetrachloride solution.

EXAMPLE 4

*Preparation of 1-ethyl-5-methoxy-2,6-dimethylindole*

To a magnetically stirred solution of 49.1 g. of 1-ethyl-5-hydroxy-2,6-dimethylindole (Example 3) in 300 ml. of ethyl alcohol and 600 ml. of 2 N sodium hydroxide solution is added dropwise over 90 min. at reflux temperature under nitrogen 100 g. (74 ml.) of methyl sulfate. The resulting mixture is heated at reflux temperature for an additional 60 min. and then extracted with ethyl acetate. The extract is washed with saline, dried over magnesium sulfate and evaporated. The residual brown oil is dissolved in benzene and passed through a magnesia-silica gel column (1.0 x 12.5 in.), benzene being used as the eluting solvent and 250 ml. fractions being collected. Fraction 1 contains 46.9 g. of amber oil and fraction 2 contains 1.0 g. These fractions crystallize on standing. A sample of this material is recrystallized from hexane to give white crystals, M.P. 56–57°.

EXAMPLE 5

*Preparation of 1-ethyl-5-methoxy-2,6-dimethyl-3-indolecarboxaldehyde*

To 200 ml. of magnetically-stirred, ice-chilled dimethylformamide is added dropwise at such a rate that the temperature remains at 0–5° C. 55 g. (32.8 ml.) of phosphorus oxychloride. The resulting solution is treated with a solution of 66.35 g. of 1-ethyl-5-methoxy-2,6-dimethylindole (Example 4) in 150 ml. of dimethylformamide at such a rate that the temperature does not exceed 5° C. The ice bath is removed and replaced by a warm water-bath, and the mixture is stirred at 35–40° for 1.25 hr. Cracked ice (200 ml.) is added and the mixture is transferred to a 3 l. round-bottom flask containing about 300 g. of cracked ice, 200 ml. of water being used to aid in the transfer. A solution of 250 g. of sodium hydroxide in 650 ml. of water is added dropwise with mechanical stirring until about one-half of the solution has been added; the remainder of the solution is added rapidly. The resulting mixture is heated to the boiling point, diluted with water to a volume of about 2.5 l. and cooled. Filtration gives 70.5 g. of crystals, M.P. 134–136°.

EXAMPLE 6

*Preparation of 2,5-dimethyl-4-nitroanisole*

A well stirred suspension of 16.7 g. (0.1 mole) of 2,5-dimethyl-4-nitrophenol (R. L. Datta and P. S. Varma, J. Am. Chem. Soc., 41, 2042 (1919) in 50 ml. of water at 40–45° is treated alternately and in portions with a solution of 7.0 g. of sodium hydroxide in 18 ml. of water and 12 ml. of methyl sulfate. After 2 hours the mixture is filtered, and the solid is recrystallized from dilute methanol to give 14.5 g. (80% yield) of needles, M.P. 90–92°.

EXAMPLE 7

*Preparation of 5-methoxy-4-methyl-2-nitrophenylpyruvic acid*

Ethanol (6.25 ml.) is added to a mechanically stirred slurry of 2.15 g. (0.055 g.-atoms) of potassium in benzene. After all of the potassium reacts, the solvents are removed by distillation, benzene (50 ml.) is added and removed in the same manner. The cooled residue is slurried in 100 ml. of ether and treated with 7.3 g. (0.05 mole, 6.75 ml.) of ethyl oxalate. To the resulting solution is added a solution of 9.05 g. (0.05 mole) of 2,5-dimethyl-4-nitroanisole (Example 6) in 150 ml. of ether. A red solid separates immediately and the mixture is mechanically stirred at room temperature for 18 hours and then at reflux temperature for 4 hours. The mixture is filtered, and the solid is washed with ether. The residue is dissolved in water and the solution is heated on the steam-bath for 30 minutes. The solution is cooled and extracted with ether. The aqueous solution is acidified with hydrochloric acid and filtered to give 6.123 g. of crystals, M.P. 167–170°.

EXAMPLE 8

*Preparation of 5-methoxy-6-methyl-2-indolecarboxylic acid*

A solution of 42.0 g. (0.166 mole) of 5-methoxy-4-methyl-2-nitrophenylpyruvic acid (Example 7) in 230 ml. of 17% ammonium hydroxide and 115 ml. of water is treated with a hot solution of 300 g. of ferrous sulfate heptahydrate in 340 ml. of water. The mixture is mechanically stirred at steam-bath temperature for 1 hour and then allowed to cool to room temperature and filtered.

The residue is washed with dilute ammonium hydroxide until a test portion becomes only milky on acidification. The combined filtrate and washings are acidified with hydrochloric acid and the solid which separates is collected by filtration. The moist solid is recrystallized from dilute acetic acid to give 19.0 g. (56% yield) of light brown solid, M.P. 240–242° (gas evolution).

EXAMPLE 9

*Preparation of 5-methoxy-6-methylindole*

5-methoxy-6-methyl-2-indolecarboxylic acid (Example 8) (3.61 g., 17.6 mmoles) is heated at 260–270° until the melt becomes quiescent and then taken to and held briefly at 300°. The cooled material is dissolved in ether, and this solution is washed with sodium carbonate solution, treated with activated carbon, dried over magnesium sulfate and taken to dryness. The solid is recrystallized from ether-petroleum ether to give 2.12 g. of crystals, M.P. 119–120°.

EXAMPLE 10

*Preparation of 5-methoxy-6-methyl-3-indolecarboxaldehyde*

To 3.5 ml. of dimethylformamide is added with magnetic stirring and ice cooling 1.69 g. (11 mmoles, 1 ml.) of phosphorous oxychloride. To this solution is then added dropwise a solution of 1.61 g. (10 mmoles) of 5-methoxy-6-methylindole (Example 9) in 8 ml. of dimethylformamide. The temperature of the reaction is kept below 10° C. during the addition which requires 20 minutes. A solid separates 15 minutes after the start of the addition. Upon completion of the addition, the ice bath is removed and replaced by a warm water bath. The paste is kept at 30–35° C. with magnetic stirring for 45 minutes. Crushed ice is added to the mixture which is then treated with a solution of 4.5 g. of sodium hydroxide in 20 ml. of water. The mixture is brought to boiling and then chilled in an ice bath to give 1.74 g. of tan solid, M.P. 192–195°.

EXAMPLE 11

*Preparation of 1-ethyl-5-methoxy-6-methyl-3-indolecarboxaldehyde*

A mixture of 1.74 g. (9.2 mmoles) of 5-methoxy-6-methyl-3-indolecarboxaldehyde (Example 10) and 30 ml. of 40% potassium hydroxide solution is heated with mechanical stirring on the steam bath. When the mixture becomes hot, all solid dissolves and 10.0 g. (65 mmoles, 8.5 ml.) of ethyl sulfate is added in five equal portions over 1 hour. The solution is allowed to cool, whereon crystals separate from the aqueous solution. The mixture is extracted with ethyl acetate, and the extract is washed with saline, dried over magnesium sulfate and evaporated. The residue crystallizes from ether-petroleum ether (B.P. 30–60°) to give 1.287 g. of crystals, M.P. 92–94°.

EXAMPLE 12

*Preparation of 1-ethyl-5-methoxy-6-methyl-4-nitro-3-indolecarboxaldehyde*

To an ice-chilled, magnetically-stirred solution of 1.085 g. (5.0 mmoles) of 1-ethyl-5-methoxy-6-methyl-3-indolecarboxaldehyde (Example 11) in 12 ml. of concentrated sulfuric acid is added dropwise over 30 minutes a solution of 0.425 g. (5.0 mmoles) of sodium nitrate in 7 ml. of concentrated sulfuric acid. The resulting solution is stirred for an additional 45 minutes and then poured onto a cracked ice-water mixture. The solid is extracted into methylene chloride and the extract is washed to neutrality with saline, dried with magnesium sulfate and evaporated. The residue is crystallized from acetone-hexane to give 525 mg. of light yellow solid, M.P. 150–152°.

EXAMPLE 13

*Preparation of 1-ethyl-5-methoxy-2,6-dimethyl-4-nitro-3-indolecarboxaldehyde*

In the manner described in Example 12 treatment of 1 - ethyl-5-methoxy-2,6-dimethyl-3-indolecarboxaldehyde (Example 5) with sodium nitrate in sulfuric acid produces orange crystals, M.P. 155–157°.

EXAMPLE 14

*Preparation of 1-ethyl-3-hydroxymethyl-5-methoxy-6-methyl-4,7-dioxoindole*

A mixture of 532 mg. (2.06 mmoles) of 1-ethyl-5-methoxy-6-methyl-4-nitro-3 - indolecarboxaldehyde (Example 12) and 105 mg. of a 10% palladium-on-charcoal catalyst in 100 ml. of ethanol containing 1 ml. of water is shaken under hydrogen for 1 hour and 45 minutes. A pressure drop corresponding to 4 molar equivalents of hydrogen is observed. The mixture is filtered to give an ethanolic solution of 4-amino-1-ethyl-3-hydroxymethyl-6-methyl-5-methoxyindole.

The above solution is added with magnetic stirring to a solution of 5.60 g. of potassium nitrodisulfonate in 40 ml. of water and 120 ml. of M/6 potassium dihydrogen phosphate solution. The blue color is immediately discharged and within 10 minutes an orange color develops. Stirring is continued for 80 minutes, and the solution is diluted with water and extracted thrice with methylene chloride. The organic solution is dried over magnesium sulfate and evaporated. The residue crystallizes from ether-petroleum ether (B.P. 30–60°) to give 149 mg. of orange needles, M.P. 78–81°.

EXAMPLE 15

*Preparation of 1-ethyl-3-hydroxymethyl-5-methoxy-2,6-dimethyl-4,7-dioxoindole*

In the manner described in Example 14 a solution of 1-ethyl-5-methoxy-2,6-dimethyl-4-nitro-3-indolecarboxaldehyde (Example 13) in ethanol is treated with hydrogen in the presence of a 10% palladium-on-charcoal catalyst to give an alcoholic solution of 4-amino-1-ethyl-3-hydroxymethyl-5-methoxy-2,6-dimethylindole.

Oxidation of this substance with potassium nitrosodisulfonate in the manner described in Example 14 produces red-orange needles, M.P. 85–87°.

EXAMPLE 16

*Preparation of ethyl 5-hydroxy-1,2,6-trimethyl-3-indolecarboxylate*

By the procedure described in Example 2 a solution of 85.4 g. of toluoquinone in 350 ml. of acetone is treated with 86.2 g. of ethyl β-methylaminocrotonate [S. A. Glickman and A. C. Cope, J. Am. Chem. Soc., 67, 1017 (1945)] to give 52.2 g. of crystals, M.P. 212–216°. After recrystallization from alcohol and then acetone a sample is obtained as white crystals, M.P. 222–225°.

EXAMPLE 17

*Preparation of 5-hydroxy-1,2,6-trimethylindole*

In the manner described in Example 3 treatment of ethyl 5-hydroxy-1,2,6-trimethyl-3-indolecarboxylate (Example 16) with boiling 20% hydrochloric acid solution produces white crystals, M.P. 124–126°.

EXAMPLE 18

*Preparation of 5-methoxy-1,2,6-trimethylindole*

By the procedure described in Example 4 treatment of an alcoholic solution of 5-hydroxy-1,2,6-trimethylindole (Example 17) with a sodium hydroxide solution and methyl sulfate gives white crystals, M.P. 75–77°.

EXAMPLE 19

*Preparation of 5-methoxy-1,2,6-trimethyl-3-indolecarboxaldehyde*

In the manner described in Example 5 treatment of 5-methoxy-1,2,6-trimethylindole (Example 18) with phosphorus oxychloride and dimethylformamide produces crystals having M.P. 183–186°.

EXAMPLE 20

*Preparation of 5-methoxy-1,2,6-trimethyl-4-nitro-3-indolecarboxaldehyde*

To a magnetically stirred solution of 2.00 g. of 5-methoxy-1,2,6-trimethyl-3-indolecarboxaldehyde in 100 ml. of glacial acetic acid is added with cooling 2 ml. of yellow fuming nitric acid at such a rate that the temperature does not exceed 20°. Dilution with water affords the crude product having M.P. 132–137°. Three recrystallizations from acetone-hexane give solid having M.P. 192–194°.

EXAMPLE 21

*Preparation of 4-amino-3-hydroxymethyl-5-methoxy-1,2,6-trimethylindole*

In the manner described in Example 14 hydrogenation of a mixture of 5-methoxy-1,2,6-trimethyl-4-nitro-3-indolecarboxaldehyde and a 10% palladium-on-carbon catalyst in ethyl alcohol is productive of this compound.

What is claimed is:

1. A member of the class consisting of compounds of the formula:

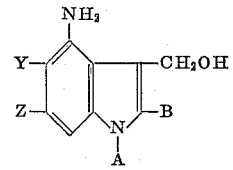

wherein A and Z are lower alkyl, Y is lower alkoxy, and B is selected from the group consisting of hydrogen and lower alkyl, and the acid-addition salts thereof.

2. 4-amino-1-ethyl-3-hydroxymethyl-6-methyl-5-methoxyindole.

3. 4-amino-1-ethyl-3-hydroxymethyl-5-methoxy-2,6-dimethylindole.

4. 4-amino-3-hydroxymethyl-5-methoxy-1,2,6-trimethylindole.

References Cited by the Examiner

Cram et al.; Organic Chemistry, McGraw-Hill Book Co. Inc., New York, 1959, pages 49, 74, and 354.

NICHOLAS S. RIZZO, *Primary Examiner.*